United States Patent
Chin et al.

[11] Patent Number: 5,805,819
[45] Date of Patent: Sep. 8, 1998

[54] METHOD AND APPARATUS FOR GENERATING A DISPLAY BASED ON LOGICAL GROUPINGS OF NETWORK ENTITIES

[75] Inventors: Jeffrey A. Chin, Belmont; Frank S. Lee, Santa Clara; Leon Y. K. Leong, Palo Alto; Serene H. Fan, San Jose, all of Calif.

[73] Assignee: Bay Networks, Inc., Santa Clara, Calif.

[21] Appl. No.: 931,587

[22] Filed: Sep. 16, 1997

Related U.S. Application Data

[63] Continuation of Ser. No. 427,574, Apr. 24, 1995, abandoned.

[51] Int. Cl.$^6$ .................................................. H04L 12/24
[52] U.S. Cl. ............................... 395/200.54; 395/200.48; 345/326
[58] Field of Search ..................................... 345/440, 326; 395/334, 356, 357, 200.5, 200.54, 200.48

[56] References Cited

U.S. PATENT DOCUMENTS

| | | | |
|---|---|---|---|
| 5,008,853 | 4/1991 | Bly et al. | 345/331 |
| 5,109,486 | 4/1992 | Seymour | 395/200.54 |
| 5,261,044 | 11/1993 | Dev et al. | 345/357 |
| 5,276,789 | 1/1994 | Besaw et al. | 345/440 |
| 5,295,244 | 3/1994 | Dev et al. | 345/357 |
| 5,483,631 | 1/1996 | Nagai et al. | 345/329 |
| 5,504,921 | 4/1996 | Dev et al. | 395/200.53 |
| 5,535,322 | 7/1996 | Hecht | 705/1 |
| 5,606,664 | 2/1997 | Brown et al. | 395/200.54 |
| 5,684,959 | 11/1997 | Bhat et al. | 395/200.54 |

*Primary Examiner*—Zarni Maung
*Attorney, Agent, or Firm*—Blakely, Sokoloff, Taylor & Zafman

[57] ABSTRACT

A method and apparatus are provided for grouping the network entities that belong to a network system into logical groups, and generating a display of the network based on the logical groups. In the highest level display, a single visual indicator, such as an icon, is used to represent each logical group. Thus, a display of the entire network system need only contain as many visual indicators as there are logical groups. Typically, the number of logical groups will be significantly less than the number of actual network resources. Consequently, entire large network systems may be displayed without crowding the display screen with small, difficult to read icons. The logical groups are formed based on the type of connections that exist between the various logical entities in the network. Site groups are formed by combining all local area network connections that connection common network entities. Region groups are formed by combining all wide area network connections that connect common network entities. Small site groups may be merged into the region groups to further reduce the number of visual indicators required to visually represent the network system.

24 Claims, 15 Drawing Sheets

METHOD AND APPARATUS FOR GENERATING A DISPLAY BASED ON LOGICAL GROUPINGS OF NETWORK ENTITIES

This is a continuation of application Ser. No. 08/427,574, filed Apr. 24, 1995, now abandoned.

FIELD OF THE INVENTION

The present invention relates to a networked computer system, and more specifically, to a method and apparatus for determining logical groups for network entities on a networked computer system and generating a display based on the logical groups.

BACKGROUND OF THE INVENTION

The size and complexity of computer networks have increased tremendously in recent years. Networks that link thousands or tens of thousands of devices are no longer uncommon. Unfortunately, as computer networks become more complex, so does the task of monitoring and managing them.

When networks consist of only a few linked devices, it is both efficient and effective to monitor the network based on a display that shows all of the networked devices. Network management systems have been developed which generate displays of entire network systems based on information gathered during Internet Protocol discovery ("IP discovery") operations. During an IP discovery operation, a network management station polls every router in a network system. When a router is polled, a routing table within the router is accessed. A routing table for a given router contains information about the connections between the router and other network devices.

From the information in a given routing table, the network management station determines (1) the existence of the routers in the network system, (2) the existence of the networks in the network system, and (3) the connections between the routers and the networks in the network system. Once this information has been acquired from each of the routers in the network system, the network management station correlates the information to determine the topology of the network system. Once the topology of the network system has been determined, the network management system generates a display illustrating the entire network system. A network manager can monitor and manage the network system based on this display.

Managing networks based on a single display of the entire network is effective for relatively small networks (e.g. networks with 10–30). However, for larger networks the technique is less desirable. For example, a display illustrating all of devices in a thousand-device network may take a long time to draw. Further, once drawn, the display is likely to be too complicated to be easily understood.

In light of the foregoing, it is desirable to manage larger networks based on displays that show less than all of the devices in the entire network system. However, it is also highly inefficient to merely scroll through numerous display screens in search of a particular device or section of a network. Consequently, it is highly desirable to provide a mechanism for displaying a large network system in a format that does not convey more information than can be easily understood and displayed on a conventional computer screen, but that still allows a user to quickly locate detailed information in which the user is interested.

SUMMARY OF THE INVENTION

The present invention provides a method and apparatus for grouping the network entities that belong to a network system into logical groups, and generating a display of the network based on the logical groups. In the highest level display, a single visual indicator, such as an icon, may be used to represent each logical group. Thus, a display of the entire network system need only contain as many visual indicators as there are logical groups. Typically, the number of logical groups will be significantly less than the number of actual network resources. Consequently, entire large network systems may be displayed without crowding the display screen with small, difficult to read icons.

When the visual indicator corresponding to a logical group is selected, a window opens that displays one visual indicator for each of the network entities that belong to the logical group. Some of the network entities within a logical group may themselves contain many network resources (e.g. local area networks may contain multiple hubs). When the visual indicator of such network entities is selected, a window opens that displays one visual indicator for each of the network resources within the selected network entity. Thus, a user can quickly navigate through the various display levels to obtain detailed information about the network devices in which the user is interested.

For such displays to be effective, the logical groups must correspond to intuitive network sections. According to one embodiment, the present invention creates logical groups which correspond to geographically-related network resources. For example, a group would contain all network entities that are located within a particular building complex. The present invention may also create "region groups" which correspond to larger operations.

Consequently, according to one aspect of the invention, a computer-implemented method for grouping a plurality of network entities that belong to a network system into a plurality of logical groups is provided. The plurality of network entities are connected to each other by a plurality of connections.

According to the method, connection data that represents the plurality of connections is retrieved. Each of the plurality of connections has a connection type. The connection data is inspected to determine which connections of the plurality of connections are of a first connection type. Each connection of the first connection type is assigned to one of a plurality of site groups. Each given connection of the first connection type is assigned to the same site group as all other connections of the first connection type that share a common network entity with the given connection of the first connection type. The plurality of network entities are then grouped into the plurality of logical groups based upon the plurality of site groups. According to one embodiment, the "first connection type" is a local area network connection.

Region groups are created by inspecting the connection data to determine which connections of the plurality of connections are of a second connection type. Each connection of the second connection type is assigned to one of a plurality of region groups. Each given connection of the second connection type is assigned to the same region group as all other connections of the second connection type that share a common network resource (e.g. router) with the given connection of the second connection type. According to one embodiment, the "second connection type" is a wide area network connection.

Each connection of the second connection type is assigned to one of the plurality of region groups by determining if a given connection of the second connection type does not share a network resource with any other connections of the second connection type. If the given connection of the second connection type does not share a network resource with any other connections of the second connection type, then the given connection of the second connection type is assigned to the same region group as any other connection of the second connection type that shares a common WAN with the given connection of the second connection type.

According to another aspect of the invention, site groups that are determined to be "small" are merged into the region groups. In the preferred embodiment, a user specifies the criteria used to determine whether a site group is considered small. The criteria may be, for example, that all sites with less than two local area networks are considered small.

According to another aspect of the invention, groups may be formed based on less than the entire network system. For example, a user may specify a view of the network system, where the view corresponds to a subset of the network system. Only the connection data that represents connections that exist in the subset of the network system will be retrieved.

According to yet another aspect of the invention, once the logical groups have been formed, the network resources that belong to all of the general network entities within the groups are added to the groups. For example, a particular local area network may be a member of a campus group. However, the local area network itself may consist of numerous network resources, such as hubs and workstations. Such "included" network resources should also be added as members of the campus group. To add such members, the present invention traverses a database that contains data that represents the topology of the network system.

According to another embodiment of the invention, an apparatus for generating logical groups for and displaying a network system is provided. The apparatus includes a processor, a memory, and a display device. The memory contains a sequence of instructions. The sequence of instructions include instructions which cause the processor to perform the steps described above.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for assigning the devices on a network system to a plurality of logical groups and generating a display of the network system based upon the logical groups is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
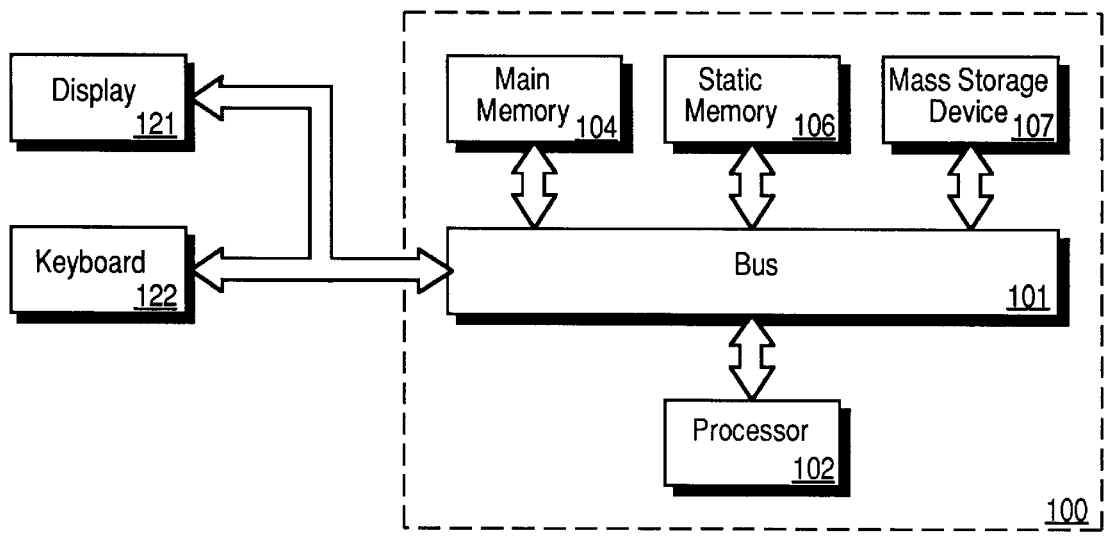
FIG. 1 is a block diagram of a computer system upon which the preferred embodiment of the present invention can be implemented.

Referring to FIG. 1, a computer system 100 upon which the preferred embodiment of the present invention can be implemented is shown. Computer system 100 comprises a bus or other communication means 101 for communicating information, and a processing means 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102.

Furthermore, a data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102.

The present invention is related to the use of computer system 100 as a network management station on a network system. Processor 102 executes instructions in memory 104 that cause computer system 100 to assign devices to logical groups, and, once the logical groups have been established, to generate on display device 121 a display of the network system based on the logical groups.

LOGICAL GROUPS

Network management stations that attempt to simultaneously display all of the devices on a large network system are difficult to use because the user is presented with too much information at once. Further, for all of the network topology to fit on a standard display device, the visual indicators used to represent the networked devices may be so small that they are difficult to read. Consequently, computer system 100 is programmed to display a high-level view of network systems in which each visual indicator on the high-level display represents all of the networked devices that correspond to a particular logical group. However, prior to generating such a display, the devices in the network system must be divided up into logical groups.

One way of establishing logical groups of devices is to allow users to manually assign devices to logical groups. For example, a user can create a database in which each device on the network system is represented by a record, and each record has a group membership field. All devices having the same value in their corresponding membership field are treated as members of the same logical group.

Alternatively, the database may include logical group records and device records. The user can manually enter data to designate links between each logical group record and the device records to establish a correlation between the corresponding logical group and devices.

Unfortunately, such manual grouping processes are highly inefficient for a large network. A vast amount of operator time would be required to establish the initial devices-to-groups correlation. Further, once the initial correlation is established, operator time would still be required to update the correlation information as the configuration and content of the network changes.

To avoid these problems, computer system 100 is programmed to establish a device-to-logical group correlation without user intervention. Specifically, computer system 100 gathers certain configuration information from devices on the network, and from the configuration information is able to assign network entities to logical groups. Once the logical groups have been established, computer system 100 generates a display of the network based on the logical groups. Computer system 100 shall now be described in greater detail with reference to an exemplary network system.

EXEMPLARY NETWORK SYSTEM

Referring to FIG. 2, it illustrates an exemplary network system 200. Computer system 100 belongs to a local area network (LAN) 202 that is part of the larger network system 200. Network system 200 includes a plurality of LANs 204, 210, 212, 220 and 226 in addition to LAN 202. The various LANs of network system 200 are connected through two wide are networks (WANs) 252 and 254. The LANs communicate with each other through a plurality a routers 206, 208, 214, 216, 218, 222 and 224. The topology of network system 200 is merely exemplary. The present invention is not limited to any particular network topology.

Routers communicate with LANs and other routers through either WAN connections or LAN connections. In general, WAN connections are slower, serial connections that can send messages over greater distances. Conversely, LAN connections are faster, non-serial connections that can only send messages over relatively shorter distances. WAN connections include, for example, dial-up connections where two devices communicate over telephone lines. In FIG. 2, solid lines are used to illustrate LAN connections, and dashed lines are used to illustrate WAN connections.

SITES

According to an embodiment of the invention, computer system 100 determines the topology of network system 200 by IP discovery, as described above. Upon completion of an IP discovery operation, computer system 100 is aware of all of the entities (i.e. routers and LANs) in network system 200, as well as the type of connections between each of the entities. Based on this information, computer system 100 determines which of the network entities are located in common sites.

SITE GROUP FORMATION

Computer system 100 groups network entities by site by based on the general rule that devices that are connected to each other by LAN connections share the same site, and devices that are connected to each other through WAN connections do not. Thus, if a LAN connection connects a first LAN to a first router, computer system 100 determines that the first LAN and the first router are at the same site. If a second LAN connection connects a second LAN to the first router, then the computer system 100 determines that the first router and the second LAN are at the same site. Because the first and second LANs are at the same site as the first router, the computer system 100 deduces that the first LAN is at the same site as the second LAN. Therefore, computer system 100 determines that the first LAN, the second LAN and the first router are all located at a single site.

Returning to the exemplary network system 200, LAN 226 is connected to router 224 through a LAN connection 250, router 224 is connected to LAN 220 through a LAN connection 248, and LAN 220 is connected to routers 214 and 222 through LAN connections 240 and 246, respectively. Since LAN 226, router 224, LAN 220, router 214 and router 222 are all interconnected through LAN connections, computer system 100 determines that these devices are located at a common site (e.g. a single building complex).

Router 206 is connected to LAN 202 through a LAN connection 228. Therefore, computer system 100 determines that LAN 202 and router 206 are located at a common site. However, router 206 is connected to router 214 through WAN connections 232 and 256. Therefore, computer system 100 also determines that the site at which LAN 202 and router 206 are located is geographically separate from the site at which LANs 226 and 220 and routers 224, 214 and 222 are located.

Similarly, router 208 is connected to LAN 204 through a LAN connection 230. Therefore, computer system 100 determines that LAN 204 and router 208 are located at a common site. However, router 208 is connected to router 214 through WAN connections 234 and 256. Therefore, computer system 100 also determines that the site at which LAN 204 and router 208 are located is geographically separate from the site at which LANs 226 and 220 and routers 224, 214 and 222 are located.

Router 216 is connected to LAN 210 through a LAN connection 236. Therefore, computer system 100 determines that LAN 210 and router 216 are located at a common site. However, router 216 is connected to router 222 through WAN connections 242 and 258. Therefore, computer system 100 also determines that the site at which LAN 210 and router 216 are located is geographically separate from the site at which LANs 226 and 220 and routers 224, 214 and 222 are located.

Router 218 is connected to LAN 212 through a LAN connection 238. Therefore, computer system 100 determines that LAN 212 and router 218 are located at a common site. However, router 218 is connected to router 222 through WAN connections 244 and 258. Therefore, computer system 100 also determines that the site at which LAN 212 and router 218 are located is geographically separate from the site at which LANs 226 and 220 and routers 224, 214 and 222 are located.

After processing the interconnection information, computer system 100 has determined that the exemplary network is spread over five sites. These five sites correspond to the site groups shown in FIG. 2b. Specifically, computer system 100 has determined that LANs 226 and 220 and routers 224, 214 and 222 are located at a first site that corresponds to a first site group 272, LAN 202 and router 206 are located at a second site that corresponds to a second site group 274, LAN 204 and router 208 are located at a third site that corresponds to a third site group 276, LAN 210 and router 216 are located at a fourth site that corresponds to a fourth site group 278, and LAN 212 and router 218 are located at a fifth site that corresponds to a fifth site group 280.

SITE GROUP DISPLAY

Typically, the responsibility for managing a large network will be allocated between numerous users based on the geographic location of devices. For example, one person may manage all of the networked devices at a particular plant, another person may manage all of the networked devices at another plant, and yet another person may manage all of the networked devices at company headquarters. Each of these users will be interested in monitoring those devices for which he is responsible, and less interested in monitoring the rest of the networked devices.

As explained above, computer system 100 determines which network entities are located at the same site based on the type of connections between the various entities of the network system 200. Once this determination has been made, computer system 100 may generate a display of the network system in which a single visual indicator is used to represent all of the entities at a particular site.

Figure 3:
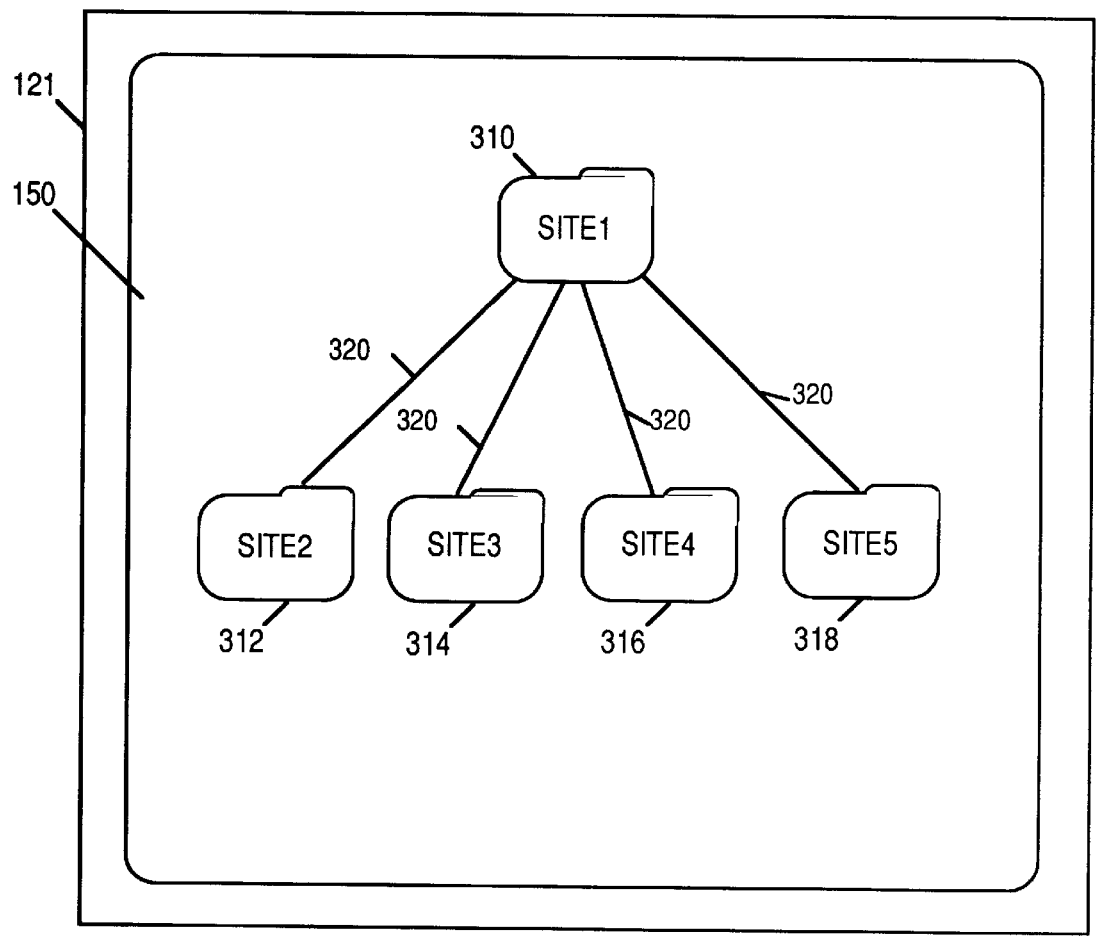
FIG. 3 illustrates a display of the network system shown in FIG. 2a where devices are geographically grouped according to an embodiment of the invention.

Referring to FIG. 3, the display device 121 of computer system 100 includes a screen 150 upon which computer system 100 generates a display of network system 200. The exemplary display of network system 200 is based on the geographically related groupings determined by computer system 100, as described above. Specifically, a single visual indicator 310 represents LANs 226 and 220 and routers 224, 214 and 222. Similarly, a single visual indicator 312 represents LAN 202 and router 206, a single visual indicator 314 represents LAN 204 and router 208, a single visual indicator 316 represents LAN 210 and router 216, and a single indicator 318 represents LAN 212 and router 218.

The visual indicator for each site may be, for example an icon that depicts a folder or some other symbol that suggests to the user that the indicator represents a group of network entities. In the preferred embodiment, similar types of network entities are represented by similar icons.

Optionally, visual indicators in the display generated by computer system 100 may illustrate the connections between the various logical groups. For example, lines 320 may connect the visual indicators that represent connected sites. In the exemplary network system 200, entities at the first site are connected through WAN connections to entities in the second, third, fourth and fifth sites. Therefore, the visual indicator 310 representing the first site is connected by lines 320 to the visual indicators 312, 314, 316 and 318 which represent the second, third, fourth and fifth sites, respectively.

Based on the display illustrated in FIG. 3, a user may quickly locate the section of the overall network for which the user has responsibility. For example, a user responsible for maintaining the portion of the network at the first site may easily locate the icon representing the first site.

DETAILED VIEWS

The visual indicator of any given site does not itself communicate much information about the network devices in the site. To get more details about a particular site, a user selects the visual indicator that represents the site using an input device, such as keyboard 122. The invention is not restricted to any particular user input device. For example, a user may alternatively use a mouse, trackball, touch-sensitive screen or light pen to select a visual indicator.

Once a user has selected a visual indicator, computer system 100 revises the display to show more details about the portion of the network system 200 represented by the selected visual indicator. For example, if a user selects visual indicator 310, which represents the first site, then computer system 100 may generate on display device 121 the display shown in FIG. 4.

Figure 4:
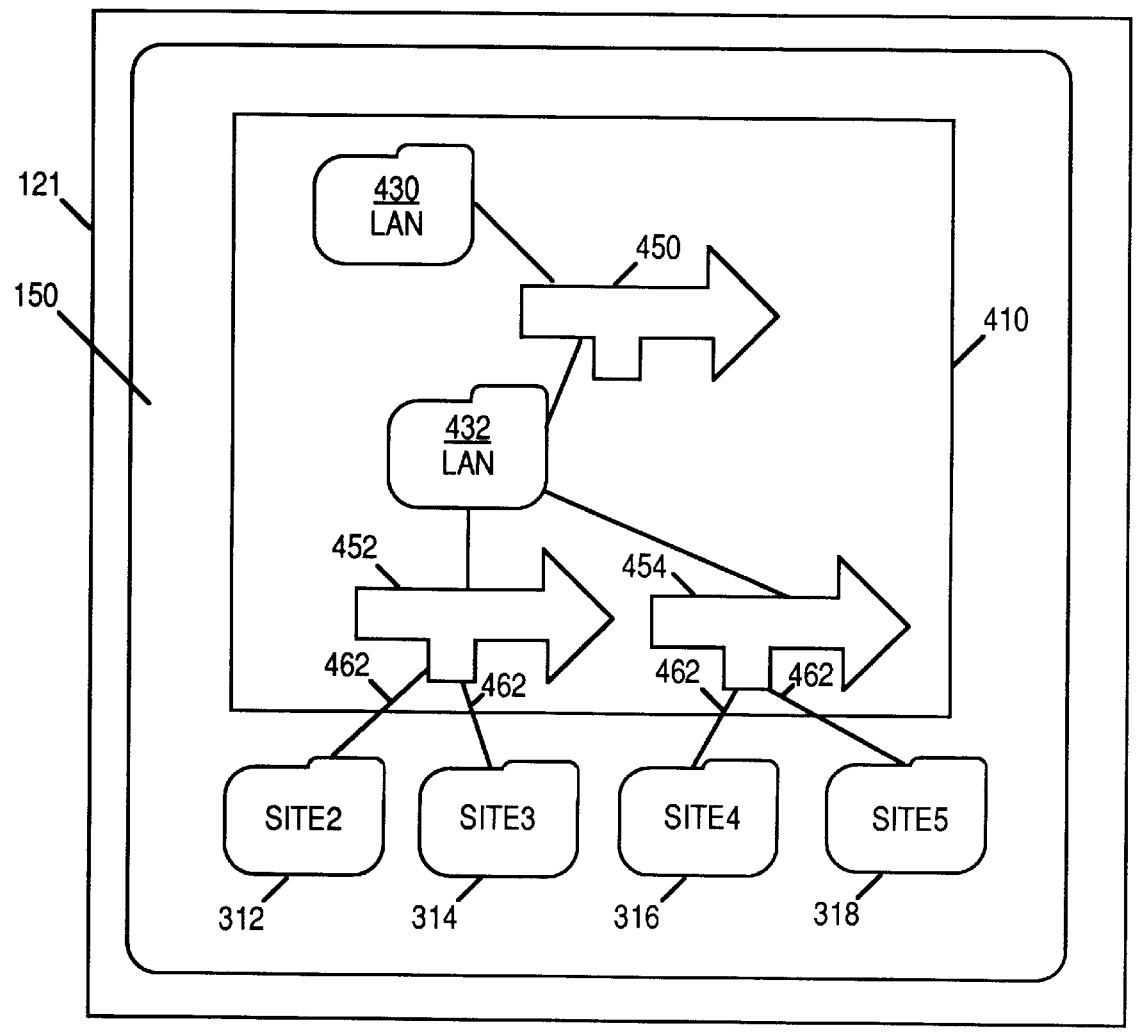
FIG. 4 illustrates a detailed window that appears when a visual indicator representing a site is selected.

Referring to FIG. 4, the visual indicator 310 representing the first site has been replaced with a window 410. Window 410 includes visual indicators for each of the network entities at the first site. Specifically, window 410 includes visual indicators 430, 432, 450, 452 and 454 representing LAN 226, LAN 220, router 224, router 214 and router 222 respectively. Window 410 may also include lines 460 that illustrate how each of the entities at the first site are connected to each other, and lines 462 to illustrate how the entities at the first site are connected to other sites.

FIG. 4 illustrates how computer system 100 may display more detail about a site when the visual indicator of the site is selected. However, in the preferred embodiment, this feature is not limited to site visual indicators. Rather, computer system 100 preferably displays more detail about any given entity when the visual indicator representing that entity is selected by a user. For example, computer system 100 may display a window illustrating each of the individual devices within LAN 226 when the visual indicator 430 that represents LAN 226 is selected by a user. Similarly, computer system 100 may display a window containing statistics about the operation of a particular device when the visual indicator that represents the device is selected by a user.

By illustrating visual indicators of sites within a network, computer system 100 allows a user to easily locate the section of the network in which the user is interested. By displaying greater detail about network entities when the visual indicators corresponding to the network entities are selected, computer system 100 further allows a user to quickly obtain the level of detail the user requires. It should be noted that, while one embodiment of computer system 100 may use pop-up windows to display greater detail, computer system 100 may alternatively replace the entire screen display with a more detailed display. These and other details will vary based on particular implementations of the invention.

REGIONS

A display showing visual indicators of the sites within a network is simpler and more easily displayed and understood than a display showing all of the devices in a large network. However, for the vast network systems in use today, even a simplified display based on sites may be too complex to easily understand. For example, a large retail chain may include hundreds of geographically distinct stores, each having its own LAN. Further, responsibility for management is often allocated on an operation by operation basis, rather than site by site.

For example, consider a network system that consists of a group of fifty geographically distinct retail stores, a group of ten geographically distinct research laboratories, and corporate headquarters. The retail stores may constitute a "sales operation" and the research laboratories may constitute a "research operation." Consequently, one person may be responsible for managing the sales operation portion of the network, another person may be responsible for managing the research operation portion of the network, and a third person may be responsible for monitoring the portion of the network corresponding to corporate headquarters.

A display of such a network system that is generated based on geographic distinctions would contain sixty-one separate visual indicators. The visual indicators would have to be very small for that many visual indicators to be simultaneously displayed on a typical computer display. Further, each of the network managers would have to visually search through sixty one visual indicators to locate the specific network section in which he is interested.

In light of the foregoing, it is clearly desirable group network entities into logical categories that are more general than sites. For example, it would be desirable to divide the network described above into three groups, where one group includes the network entities belonging to the fifty retail stores, another group includes the network entities belonging to the ten research laboratories, and another group includes the network entities belonging to the corporate headquarters.

It has been discovered that network sections that are connected to the same central router are typically involved in the same operation. For example, the ten research laboratories in the above-example may be connected through a WAN to the same router at the corporate headquarters. The connections between the router and the research laboratories will be WAN-type connections, since the research laboratories are geographically separate from the corporate headquarters.

Therefore, in the preferred embodiment of computer system 100, once computer system 100 has divided the entities of a network system into site groups, computer system 100 goes on to form region groups.

REGION GROUP FORMATION

In the preferred embodiment, the region group formation process has two general phases. In the first phase, computer system 100 forms groups of WAN connections based on common network resources. For example, if a first WAN connection connects a first WAN with a first router, and a second WAN connection connects a second WAN with the first router, then the first and second WAN have a common network resource: the first router. Therefore, the first and second WAN connections are merged to form a single region group.

All of the network entities attached by the connections in a region group are considered part of the region that corresponds to the region group. Thus, the entities connected by the first and second connections (i.e. the first WAN, second WAN and first router) therefore belong to the first region.

Figure 2A:
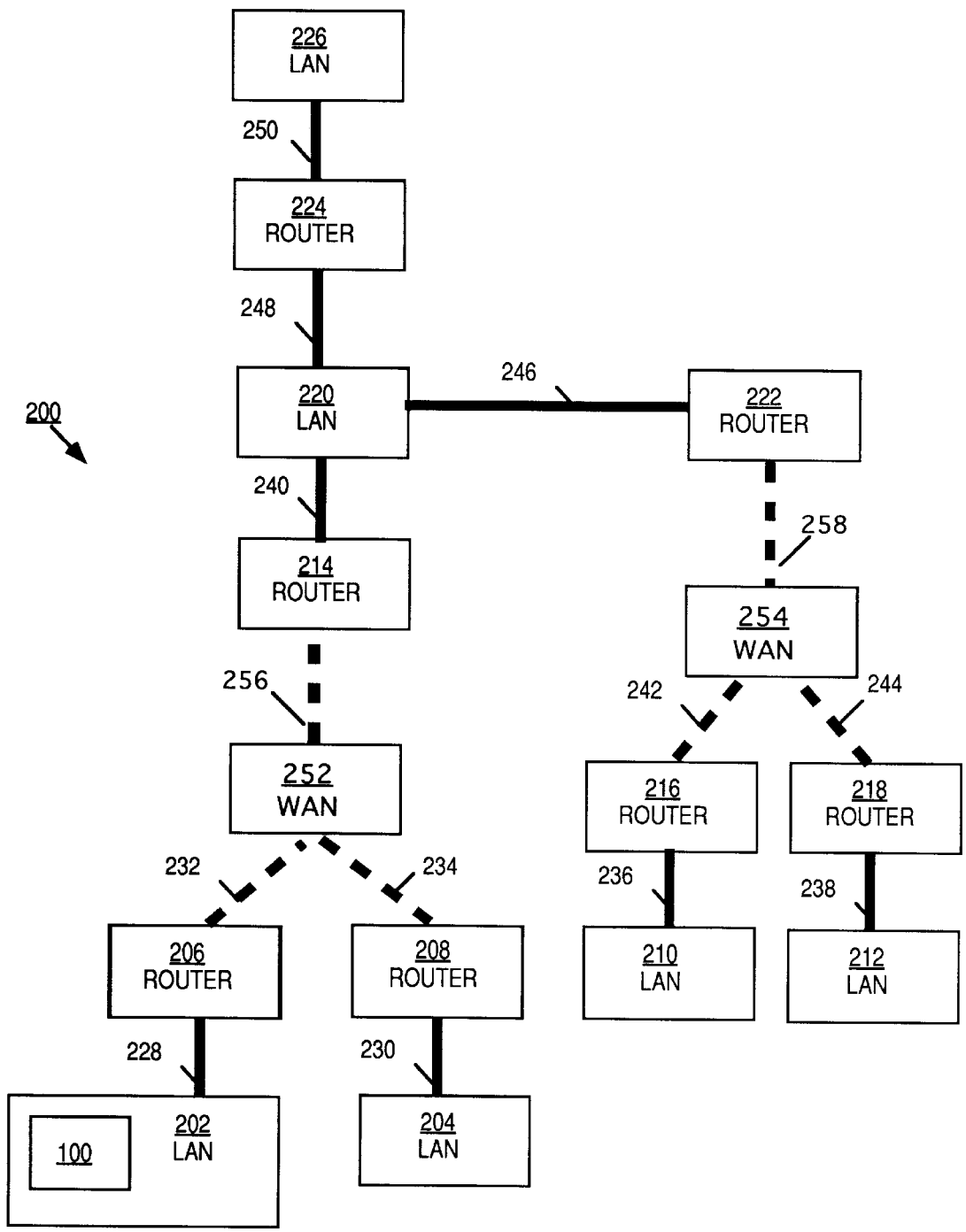
FIG. 2a is a block diagram of an exemplary network system having devices which may be grouped according to an embodiment of the invention.
Figure 2B:
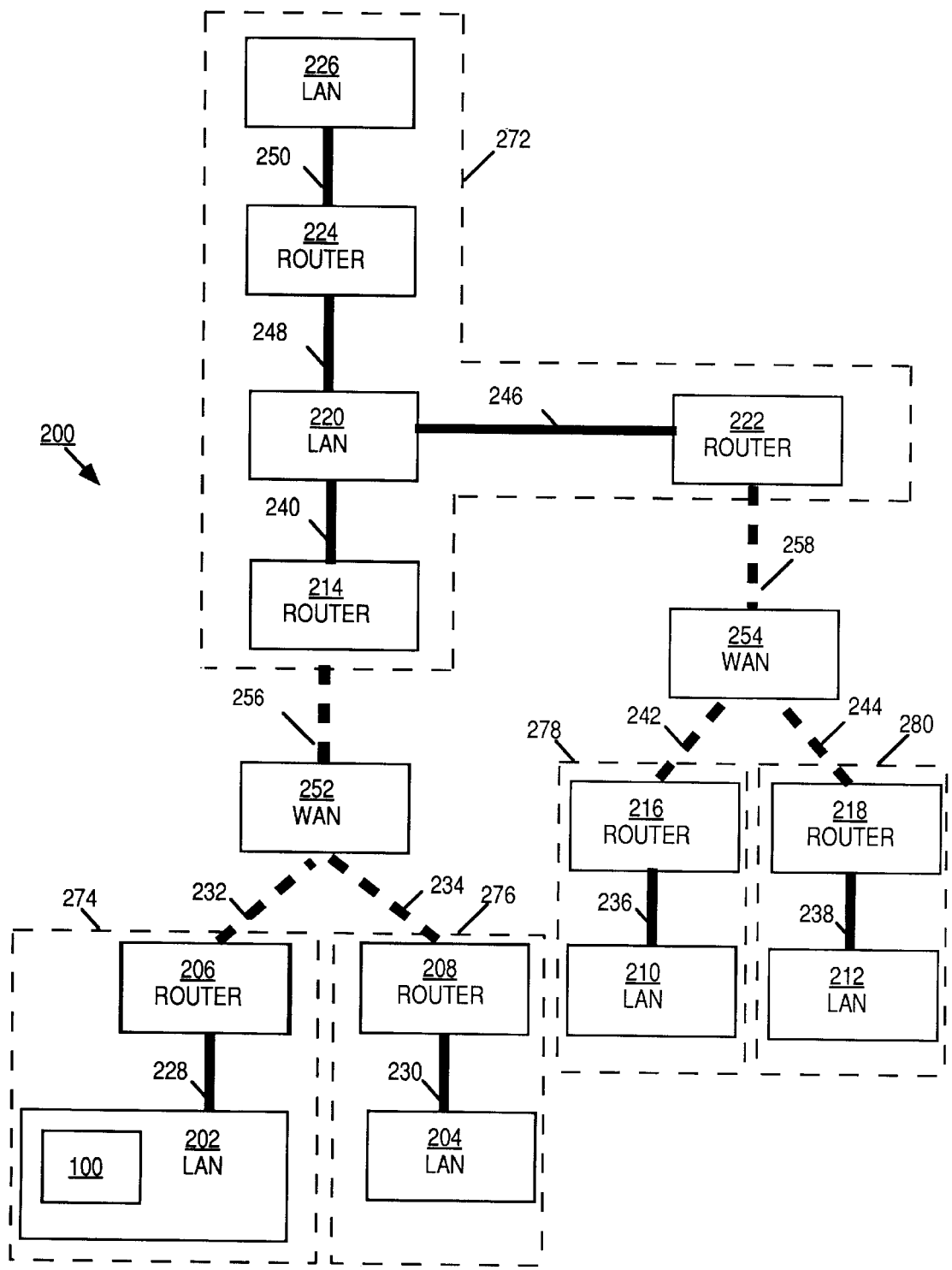
FIG. 2b is a block diagram of the exemplary network system of FIG. 2a in which the various network resources have been grouped into site groups.
Figure 2C:
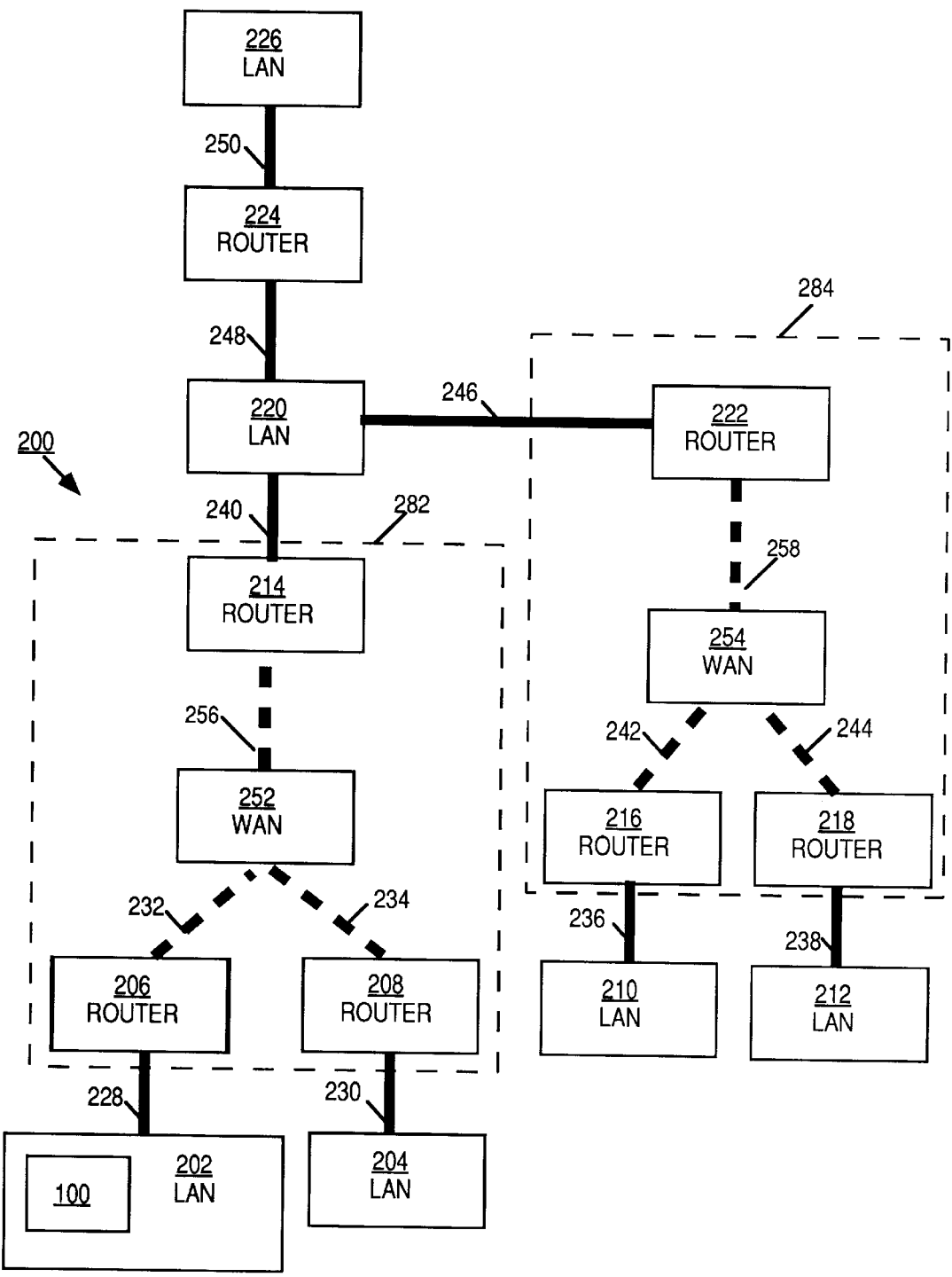
FIG. 2c is a block diagram of the exemplary network system of FIG. 2a in which the network entities have been grouped into region groups.

In the exemplary network system 200 illustrated in FIG. 2a, no region groups are formed during the first phase of the region group formation process because system 200 does not have any WANs that are connected to a common network entity.

During the second phase of the region group formation process, all of the WAN connections that were not assigned to a region group during the first phase are placed into region groups based on common WANs. For example, if a third WAN connection between a second router and the first WAN was not placed in a region group during the first phase, then it would be placed in the same region group as the first connection and the second connection because it has the first WAN in common with the first WAN connection.

Returning to the exemplary network system 200, WAN connections 232, 234 and 256 all have WAN 252 in common. Therefore, WAN connections 232, 234 and 256 would be merged into a first region group 282 (FIG. 2c) during the second phase of the region group formation process. The network entities connected by the connections in the region group (i.e. router 214, WAN 252, router 206 and router 208) all belong to a first region that corresponds to the first region group 282.

Similarly, WAN connections 242, 244 and 258 all have WAN 254 in common. Therefore, WAN connections 242, 244 and 258 would be merged into a second region group 284 during the second phase of the region group formation process. The network entities connected by the connections in the second region group (i.e. router 222, WAN 254, router 216 and router 218) all belong to a second region that corresponds to the second region group 284.

SMALL SITES

As explained above, a large network system may have too many sites to display visual representations of all sites on a single screen. According to one aspect of the present invention, the number of site groups may be reduced by merging the smaller site groups into the region groups. In the preferred embodiment, the size of a site group is determined by the number of LANs within the site group. A "small" site group is a site group that has less than a user-specified number of LANs.

Preferably, the threshold between large and small sites is selected by a user. By raising the threshold, a user increases the number of sites that are considered "small". Consequently, more sites will be merged into the region groups, and fewer visual indicators will be required to display the network. By lowering the threshold, a user decreases the number sites that are considered "small". Therefore, fewer site groups will be merged into region groups, and more visual indicators will be required to display the network.

Small site groups are merged into the region group with which they share a common network entity. For example, assume that a user has set the small/large threshold to two. Thus, all sites having less than two LANs are merged into region groups. The site groups that are not "small" are considered "campus groups".

In the exemplary network system 200 of FIG. 2, only the first site has more than one LAN. Therefore, site group 272 in considered a campus group, and the other sites are considered small sites. Consequently, the site groups 274, 276, 278 and 280 corresponding to these small sites are merged into the appropriate region groups. Specifically, site group 274 has router 206 in common with region group 282. Therefore, site group 274 is merged into region group 282. Site group 276 has router 208 in common with region group 282. Therefore site group 276 is merged into region group 282. Site group 278 has router 216 in common with region group 284. Therefore site group 278 is merged into region group 284. Site group 280 has router 218 in common with region group 284. Therefore site group 280 is merged into region group 284.

Figure 2D:
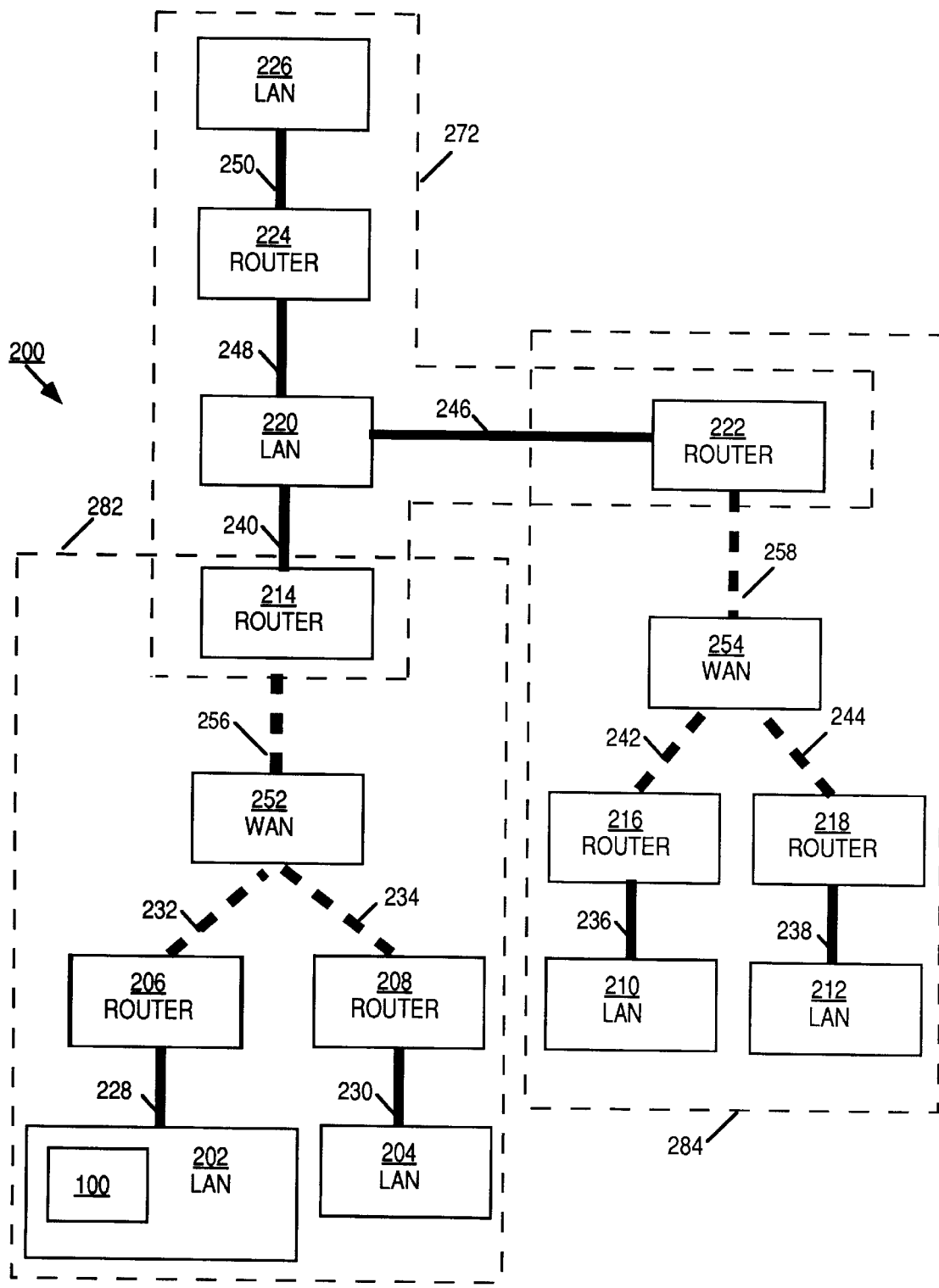
FIG. 2d is a block diagram of the exemplary network system of FIG. 2a in which the network entities have been grouped into campus and region groups.

FIG. 2d shows the logical network device groupings after the small site groups have been merged into the region groups. Of the original site groups, only site group 272 (now considered a campus group) remains. Region groups 282 and 284 have been expanded to absorb site groups 274, 276, 278 and 280.

NETWORK RESOURCE COLLECTION

The campus and region groups formed by the process described above only identify the routers, WANs and LANs that belong in each campus and region. Once these general network entities have been separated into logical groups, computer system 100 preferably places within those groups all of the network resources that belong to these general network entities. For example, LAN 226 may contain hundreds of networking resources, including LAN segments, hubs, workstations and switching devices. In the preferred embodiment, computer system 100 adds these resources to the campus and/or region groups that contain LAN 226.

To include such network resources in the campus and region groups, computer system 100 must first identify which specific network resources belong to the general network entities identified in the campus and region groups. This identification process may be performed, for example, by traversing a topology database in which records of network resources are linked to records of general network entities. Such a database is described, for example, in U.S. patent application Ser. No. 08/279,196 entitled AN APPARATUS AND METHOD FOR PROVIDING TOPOLOGY INFORMATION ABOUT A NETWORK filed on Jul. 22, 1994, the contents of which are incorporated herein by reference.

CAMPUS/REGION GROUP DISPLAY

Figure 5:
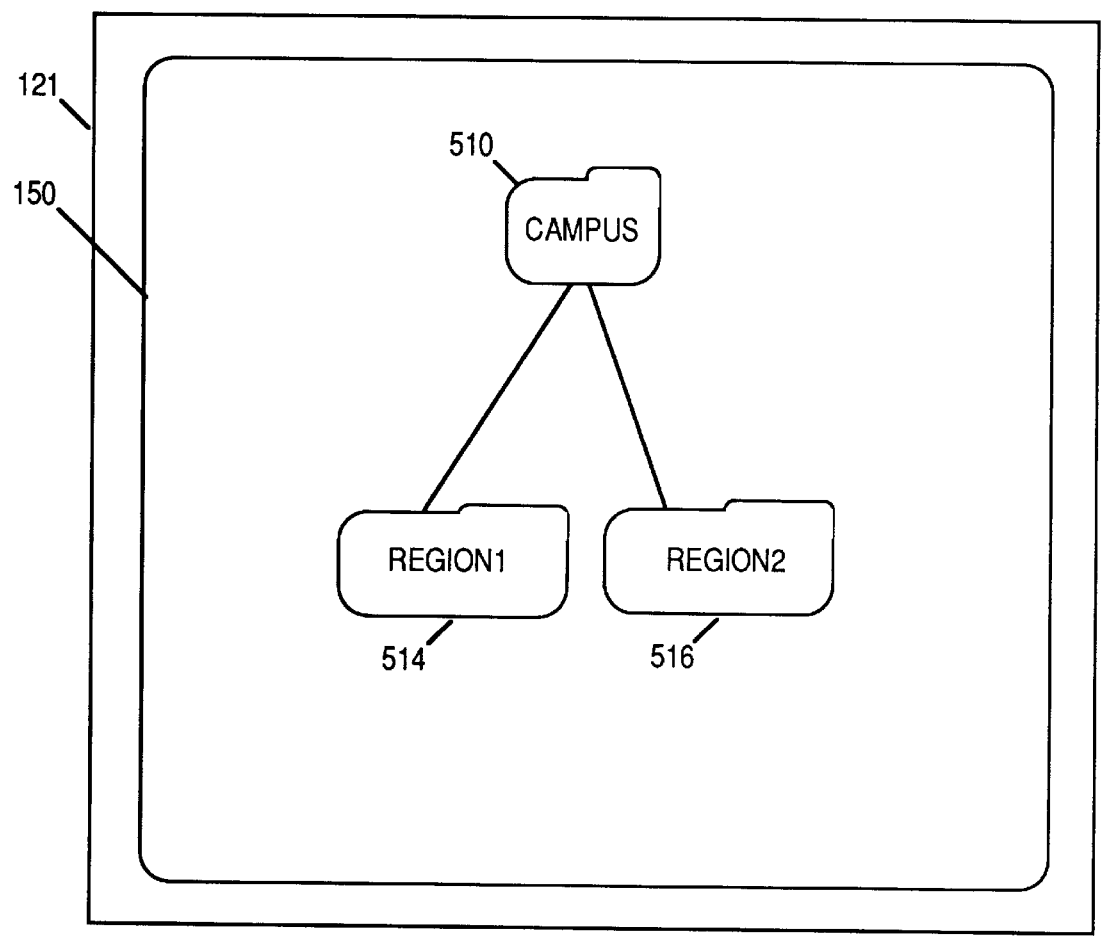
FIG. 5 illustrates a display of the network system shown in FIG. 2 where devices are grouped into campus and region groups according to an embodiment of the invention.

Once the small site groups have been merged into the region groups, computer system 100 can then generate a display of the network system 200 based on the campus and region groups, as shown in FIG. 5. Referring to FIG. 5, computer system 100 generates on display device 121 a single visual indicator 510 representing the campus corresponding to site group 272, a single visual indicator 514 to represent the region corresponding to region group 282, and a single visual indicator 516 to represent the region corresponding to region group 284.

As described above, computer system 100 generates a display showing a section of the network in greater detail when a user selects the visual indicator corresponding to the section. For example, computer system 100 generates a display that shows the network entities in the region that corresponds to region group 282 in greater detail when a user selects visual indicator 514.

Figure 6:
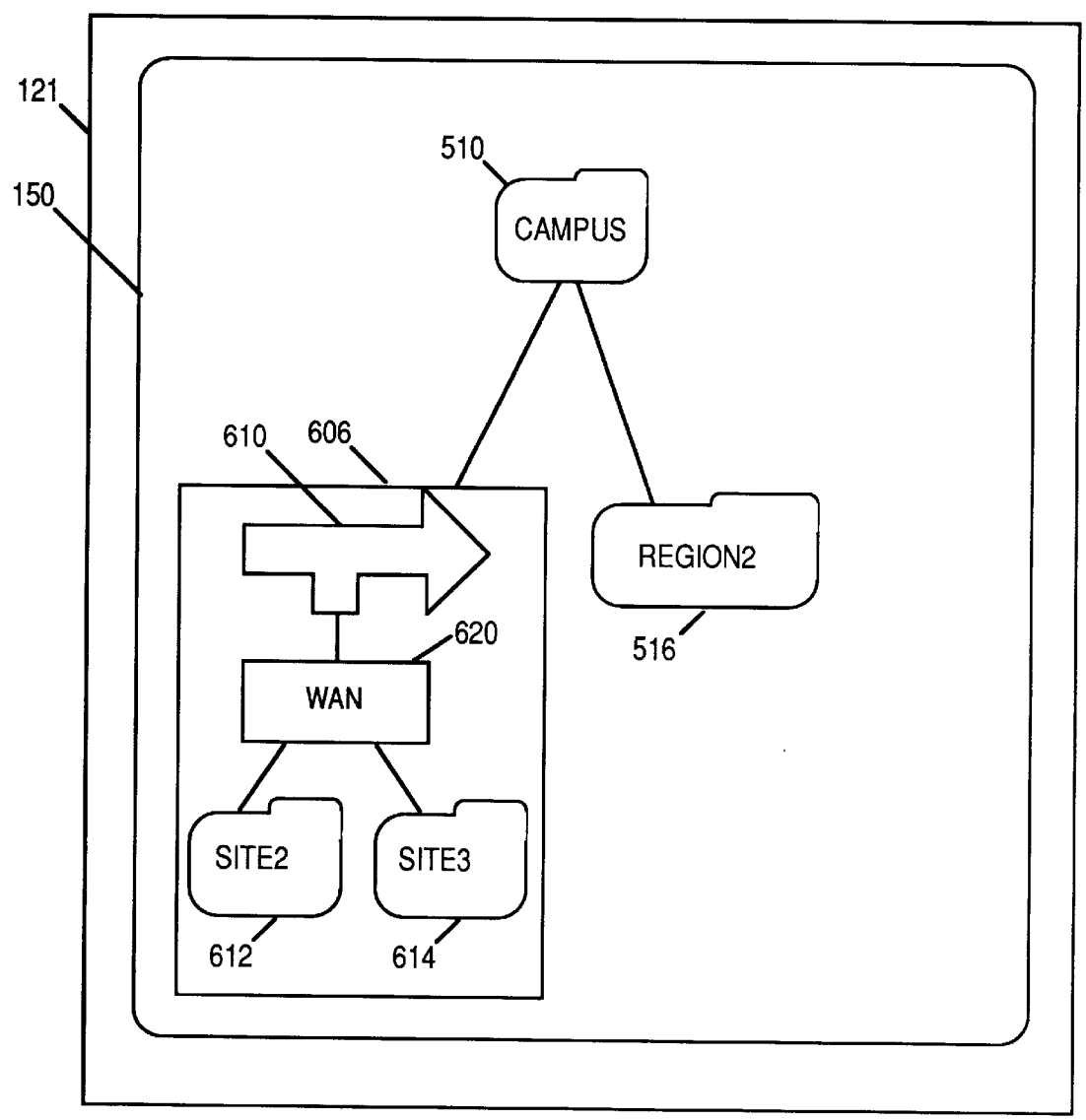
FIG. 6 illustrates a detailed window that appears when a visual indicator representing a region is selected according to one embodiment of the invention.
Figure 7:
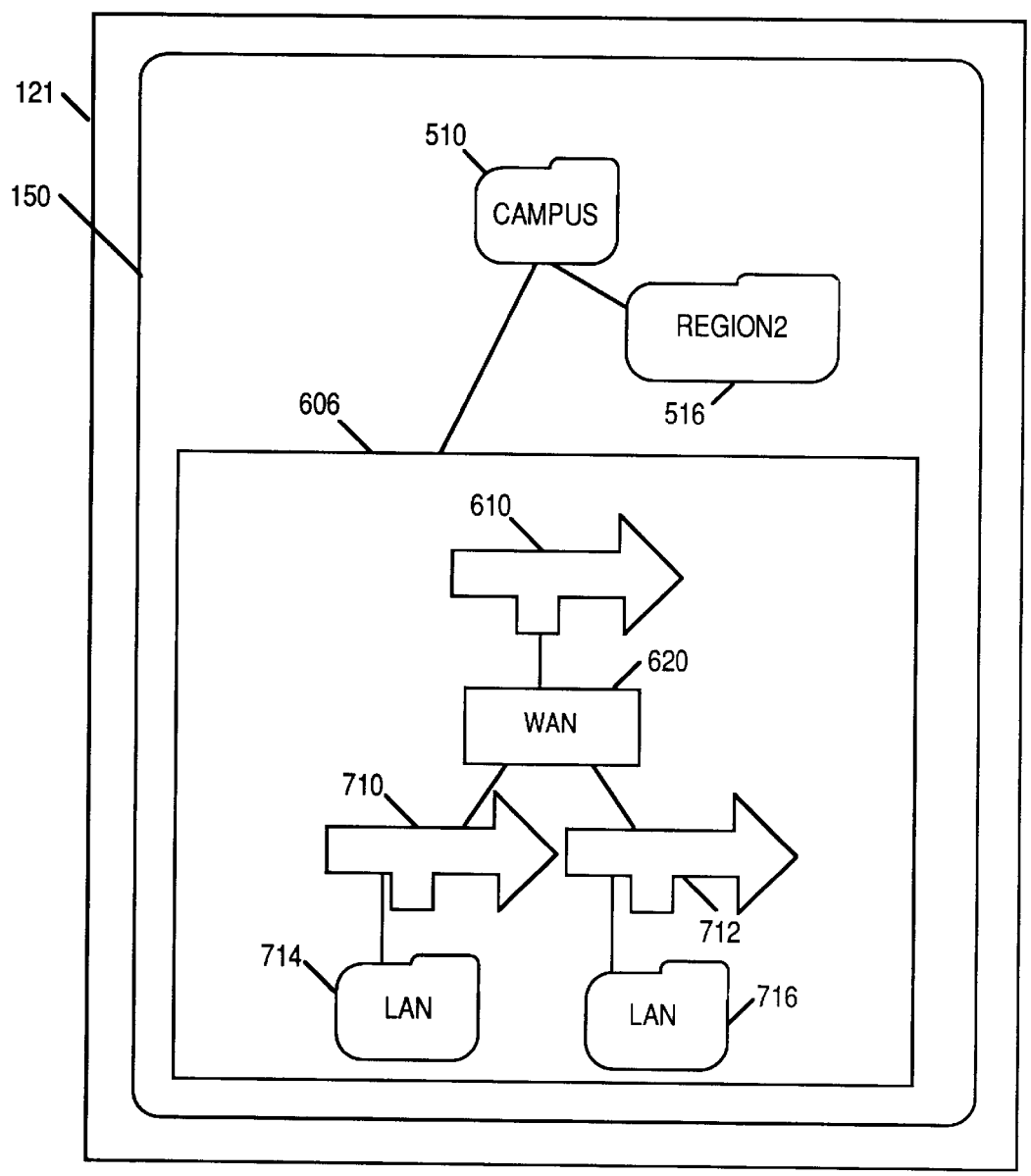
FIG. 7 illustrates a detailed window that appears when a visual indicator representing a region is selected according to an alternative embodiment of the invention.

The amount of detail shown at each display level may vary. For example, FIG. 6 illustrates an embodiment where computer system 100 generates a window 606 that displays visual indicators 612 and 614 of the two sites that are members of the first region, a visual indicator 620 to represent WAN 252 and a visual indicator 610 to represent the router 214 that is common to the two sites. In contrast, FIG. 7 illustrates an embodiment where the window 606 generated by computer system 100 includes visual indicators for devices within the region, rather than sites within the region. Specifically, window 606 includes visual indicators 710, 712, 714 and 716 representing router 206, router 208, LAN 202 and LAN 204 respectively, in addition to visual indicator 610 representing router 214 and visual indicator 620 representing WAN 252. Alternatively, an embodiment may respond to the selection of a group or campus visual indicator by opening a window to simultaneously display visual indicators of all of the network resources (e.g. workstations, hubs, switching devices) within the selected region or campus. Another embodiment may allow a user to select the granularity of each detail level.

SOURCE OF CONNECTION INFORMATION

As described above, computer system 100 acquires information about (1) the entities that exist in a network system and (2) how those entities are connected, by performing IP discovery. However, in the preferred embodiment, computer system 100 does not perform IP discovery every time a user requests a display of the network system. Rather, computer system 100 performs IP discovery on a timed basis, and stores the topology information discovered during the IP discovery operations in a database.

Computer system 100 may create and maintain the database on storage device 107. As mentioned above, the network information may be stored on storage device 107 according to the database schema described in U.S. patent application Ser. No. 08/279,196 entitled AN APPARATUS AND METHOD FOR PROVIDING TOPOLOGY INFORMATION ABOUT A NETWORK filed on Jul. 22, 1994.

In the preferred embodiment, a database is stored on storage device 107 and includes a set of connection records. Each communication line connecting two entities in the network system is represented by a connection record. Each connection record specifies (1) a type of connection and (2) the two devices connected by the connection. For example, the connection entry for WAN connection 232 would specify that the connection is a WAN connection, and that the two connected entities are WAN 252 and router 206.

Preferably, the database also includes view records, each of which corresponds to a particular section or way of looking at the network (a "view"). The view record of a given view is linked to the device records of those devices which exist in the view. According to one embodiment, computer system 100 is capable of generating logical groups based on all of the connections in a network, or based on only those connections which appear in a particular view.

THE GROUPING PROCESS

Figure 8A:
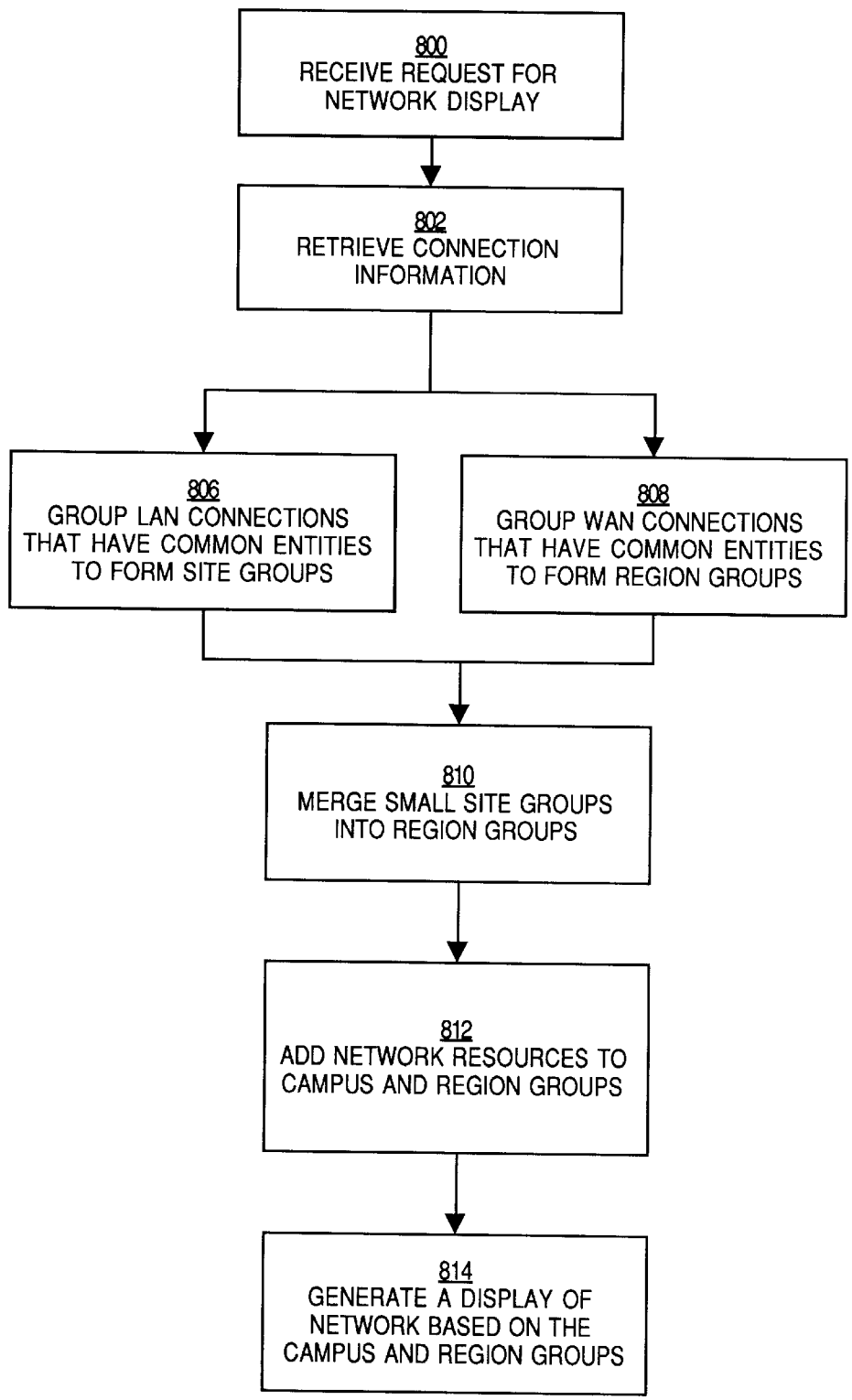
FIG. 8a is a flow chart illustrating steps for displaying a network based on campus and region groups according to an embodiment of the invention.

The general steps performed by computer system 100 to establish groups of logically-related devices have been described above. FIG. 8a is a flow chart that illustrates in greater detail the steps for generating a display of a network based on logical network entity groups.

Referring to FIG. 8a, computer system 100 receives a request to generate a display of a network system at step 800. The request may come in a variety of forms. For example, a user may request the display by (1) invoking network management software that contains instructions for generating the display, (2) selecting an option from a displayed menu, or (3) entering a particular sequence of keystrokes. Alternatively, the request may take the form of a message sent from another computer over the network system to which computer system 100 is attached. For the purposes of explanation, it shall be assumed that computer system 100 has been requested to display the exemplary network system 200 illustrated in FIG. 2.

At step 802, computer system 100 retrieves information required to determine the connections between the various entities on network system 200. As explained above, this operation may be performed through IP discovery, or by accessing a database that contains connection information acquired during previously-performed IP discovery operations.

At steps 806 and 808, computer system 100 creates site and region groups based on the connection information. Within computer system 100, these groups may take the form of data structures that store data that indicate the members of the various groups.

Specifically, at step 806, computer system 100 groups LAN connections that have common entities to form site groups. Each LAN connection is processed during this step. For the purposes of explanation, it shall be assumed that the LAN connections will be processed in the following order: LAN connection 250, LAN connection 248, LAN connection 246, LAN connection 240, LAN connection 228, LAN connection 230, LAN connection 238 and LAN connection 236.

During the processing of LAN connection 250, LAN connection 250 is initially be established as a site group 1. Then computer system 100 searches the other LAN connections to determine if either of the network entities connected to LAN connection 250 (i.e. router 224 or LAN 226) is connected to any other LAN connection. Router 224 is connected to LAN connection 248, so LAN connection 248 is added to site group 1.

After processing LAN connection 250, computer system 100 proceeds to LAN connection 248. LAN connection 248 already belongs to a site group, so no new site group is created. Computer system 100 then determines whether any LAN connection that is not already in site group 1 has a common network entity with LAN connection 248. LAN 220, which is connected to LAN connection 248, is connected to both LAN connection 246 and LAN connection 240. Therefore, LAN connection 246 and LAN connection 240 are added to site group 1. Computer system 100 then proceeds to LAN connection 246.

No LAN connection other than those already belonging to site group 1 has a common network entity with LAN connection 246, so computer system 100 proceeds to LAN connection 240. No LAN connection other than those already belonging to site group 1 has a common network entity with LAN connection 240, so computer system 100 proceeds to LAN connection 228.

LAN connection 228 does not already belong to a site group, so a new site group (site group 2) is created. LAN connection 228 is established as the initial member of site group 2. Computer system 100 determines that no other LAN connections have a network entity in common with LAN connection 228, so computer system 100 proceeds to LAN connection 230.

LAN connection 230 does not already belong to a site group, so a new site group (site group 3) is created. LAN connection 230 is established as the initial member of site group 3. Computer system 100 determines that no other LAN connections have a network entity in common with LAN connection 228, so computer system 100 proceeds to LAN connection 238.

LAN connection 238 does not already belong to a site group, so a new site group (site group 4) is created. LAN connection 238 is established as the initial member of site group 4. Computer system 100 determines that no other LAN connections have a network entity in common with LAN connection 228, so computer system 100 proceeds to LAN connection 236.

LAN connection 236 does not already belong to a site group, so a new site group (site group 5) is created. LAN connection 236 is established as the initial member of site group 5. Computer system 100 determines that no other LAN connections have a network entity in common with LAN connection 228. After processing LAN connection 236, all LAN connections have been processed. The memberships of the various site groups will be as shown in Table 1.

TABLE 1

| LOGICAL GROUP | CONTAINED ENTITIES |
| --- | --- |
| SITE GROUP 1<br>LAN CONNECTIONS 250,<br>248, 246 and 240 | ROUTER 224, LAN 226, LAN 220,<br>ROUTER 222, ROUTER 214 |
| SITE GROUP 2<br>LAN CONNECTION 228 | ROUTER 206, LAN 202 |
| SITE GROUP 3<br>LAN CONNECTION 230 | ROUTER 208, LAN 204 |
| SITE GROUP 4<br>LAN CONNECTION 238 | ROUTER 218, LAN 212 |
| SITE GROUP 5<br>LAN CONNECTION 236 | ROUTER 216, LAN 210 |

Computer system 100 may proceed to generate a display of network system 200 based on these site groups. Such a display is illustrated in FIG. 3, described above. However, in the preferred embodiment, computer system 100 proceeds further to create region groups.

At step 808, computer system 100 groups the WAN connections that have common network entities to form region groups. Upon completion of step 810, the six WAN connections 256, 232, 234, 258, 242 and 244 will have been merged into two region groups as shown in Table 2.

TABLE 2

| LOGICAL GROUP | CONTAINED ENTITIES |
| --- | --- |
| REGION GROUP 1<br>WAN CONNECTIONS 256,<br>232 and 234 | ROUTER 214, WAN 226, ROUTER<br>206, ROUTER 208 |
| REGION GROUP 2<br>WAN CONNECTIONS 258,<br>242 and 244 | ROUTER 222, WAN 254, ROUTER<br>216, ROUTER 218 |

At step 812, computer system 100 merges each small site group into the region group with which it has a common network entity. For the purposes of explanation, it shall be assumed that all site groups with less than two LANs are considered small site groups. It shall also be assumed that computer system 100 will process site groups 1 through 5 in sequence.

Initially, computer system 100 will determine if the currently processed site group is a small site group. Site group 1 is not a small site group, since it contains more than one LAN. Therefore, site group 1 is considered a campus group, and is not merged into any region group. Computer system 100 then proceeds to process site group 2.

Site group 2 is a small site group since it only contains one LAN (LAN 202). Therefore, site group 2 is merged into the region group with which it shares a network entity. Site group 2 has router 206 in common with region group 1. Therefore site group 2 is merged into region group 1. Computer system 100 then proceeds to process site group 3.

Site group 3 is a small site group since it only contains one LAN (LAN 204). Therefore, site group 3 is merged into the region group with which it shares a network entity. Site group 3 has router 208 in common with region group 1. Therefore site group 3 is merged into region group 1. Computer system 100 then proceeds to process site group 4.

Site group 4 is a small site group since it only contains one LAN (LAN 210). Therefore, site group 4 is merged into the region group with which it shares a network entity. Site group 4 has router 216 in common with region group 2. Therefore site group 4 is merged into region group 2. Computer system 100 then proceeds to process site group 5.

Site group 5 is a small site group since it only contains one LAN (LAN 212). Therefore, site group 5 is merged into the region group with which it shares a network entity. Site group 5 has router 218 in common with region group 2. Therefore site group 5 is merged into region group 2. At this point, all of the site groups have been processed and step 810 is complete. Upon completion of step 810, computer system 100 will have created the campus and region groups shown in Table 3.

TABLE 3

| LOGICAL GROUP | CONTAINED ENTITIES |
| --- | --- |
| CAMPUS 1 | ROUTER 224, LAN 226, LAN 220, |
| SITE 1 | ROUTER 222, ROUTER 214 |
| LAN CONNECTIONS | |
| LAN CONNECTIONS 250, 248, 246 and 240 | |
| REGION 1 | ROUTER 214, ROUTER 206, |
| WAN CONNECTIONS 256, 232, 234 | ROUTER 208, LAN 202, LAN 204 |
| LAN CONNECTIONS 228, 230 | |
| REGION 2 | ROUTER 222, ROUTER 216, |
| WAN CONNECTIONS 258, 242, 244 | ROUTER 218, LAN 212, LAN 210 |
| LAN CONNECTIONS 236, 238 | |

Once computer system 100 has determined the campus and region groups for network system 200, computer system 100 traverses a topology database to identify network resources that belong to the general network entities contained in the logical campus and region groups. At step 812, the network resources are added to the appropriate logical groups. At step 814, computer system 100 generates a display of network system 200 based on the campus and region groups, such as the display show in FIG. 5.

Figure 8B:
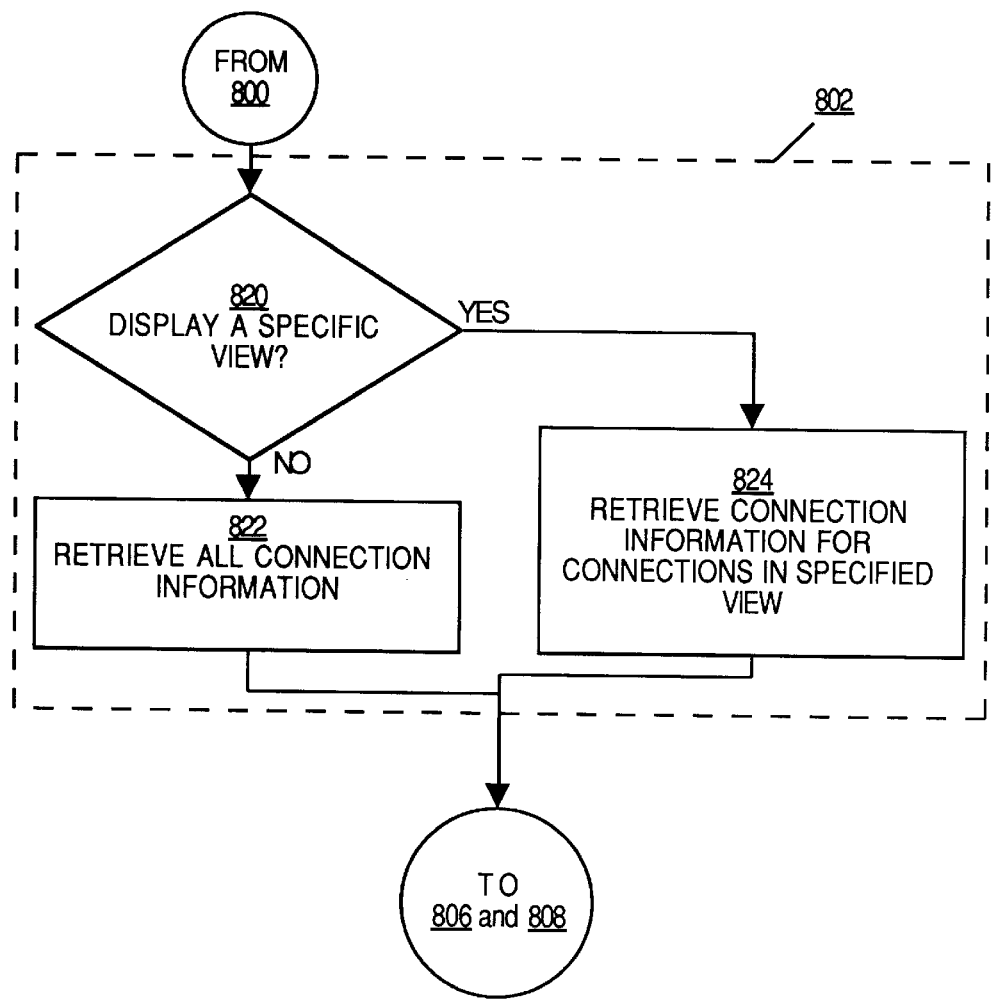
FIG. 8b is a flow chart illustrating step 802 of FIG. 8a in greater detail.

FIG. 8b illustrates step 802 in greater detail. Referring to FIG. 8b, once a request to display a network system has been received, computer system 100 determines whether the request is to display the entire network system, or only those devices which belong to a specific view of the network system, at step 820. If the display of a specific view is requested, data representing the connections corresponding to the specified view are retrieved at step 824. Otherwise, data representing all of the connections in the network system are retrieved at step 822. As mentioned above, the connection information may be retrieved directly from the network devices through IP discovery, or from a database containing data about the topology of the network system. Once the necessary connection information has been retrieved, control passes to steps 806 and 808.

Figure 8C:
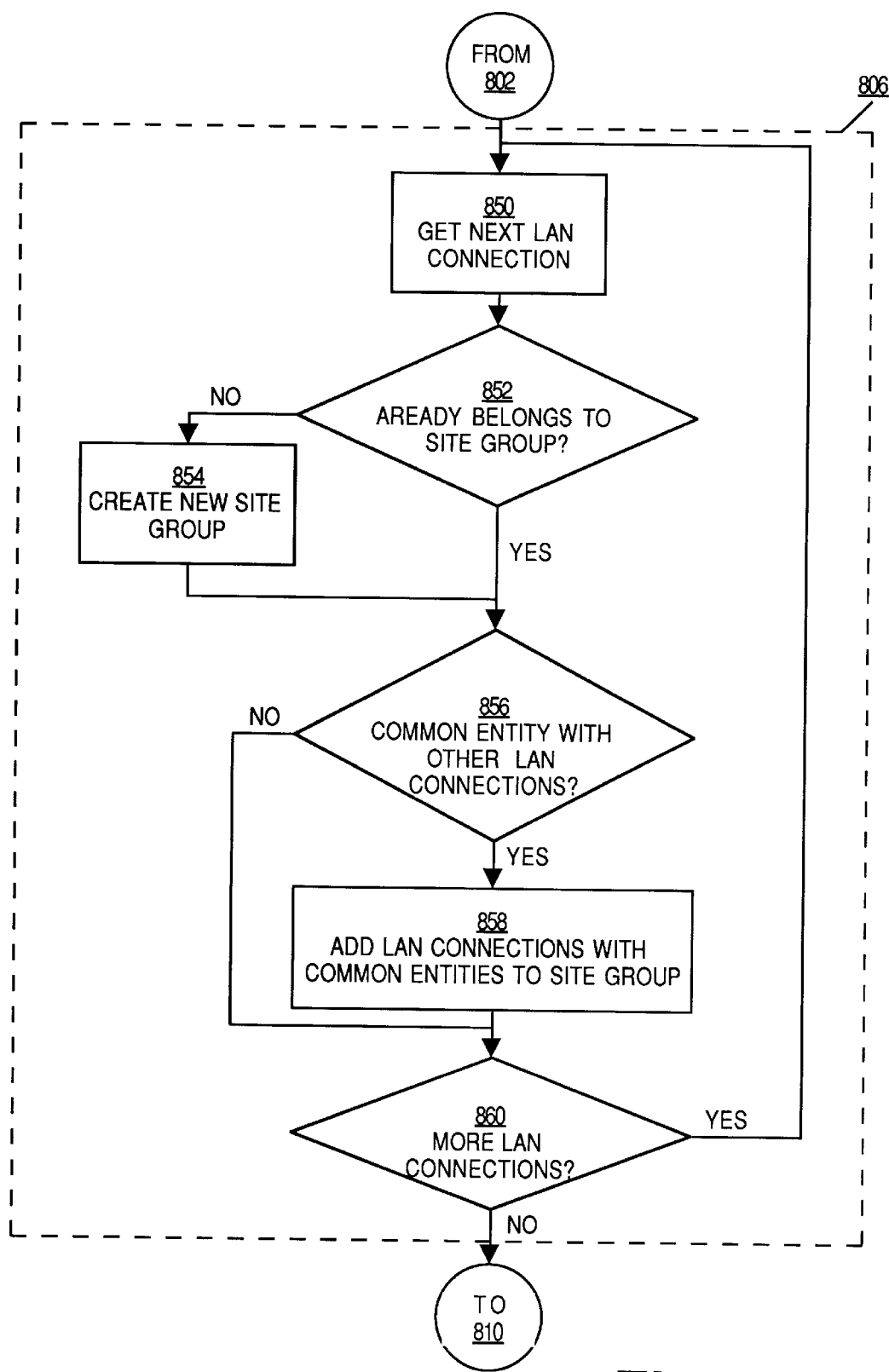
FIG. 8c is a flow chart illustrating step 806 of FIG. 8a in greater detail.

FIG. 8c is a flow chart illustrating step 806 in greater detail. Once the appropriate LAN and WAN connections have been retrieved, control passes to step 850. Steps 850 and 860 define a loop, such that the steps between steps 850 and 860 are performed for each LAN connection.

At step 852, computer system 100 determines whether the currently selected LAN connection already belongs to a site group. If the currently selected LAN connection already belongs to a site group, then control passes to step 856. Otherwise, if the currently selected LAN connection does not already belong to a site group, control passes to step 854.

At step 854, a new site group is created and the current LAN connection is added to the new site group. Control then passes to step 856.

At step 856, computer system 100 determines whether any entity in the current LAN connection is connected to any other LAN connection that is not already a member of the site group to which the current LAN connection belongs (the "current site group"). If the current LAN connection does have a common entity with another LAN connection not already a member of the current site group, then control passes to step 858. Otherwise, control passes to step 860.

At step 858, LAN connections that are not already a member of the current site group, but which have a common entity with the current LAN connection, are added to the current site group. If any LAN connection being added to the current site group is already a member of another site group, then the other site group is merged into the current site group.

At step 860, computer system 100 determines whether all of the LAN connections have been processed. If all of the LAN connections have been processed, control passes to step 808. Otherwise, control passes back to step 850 and the next LAN connection is processed.

Figure 8D:
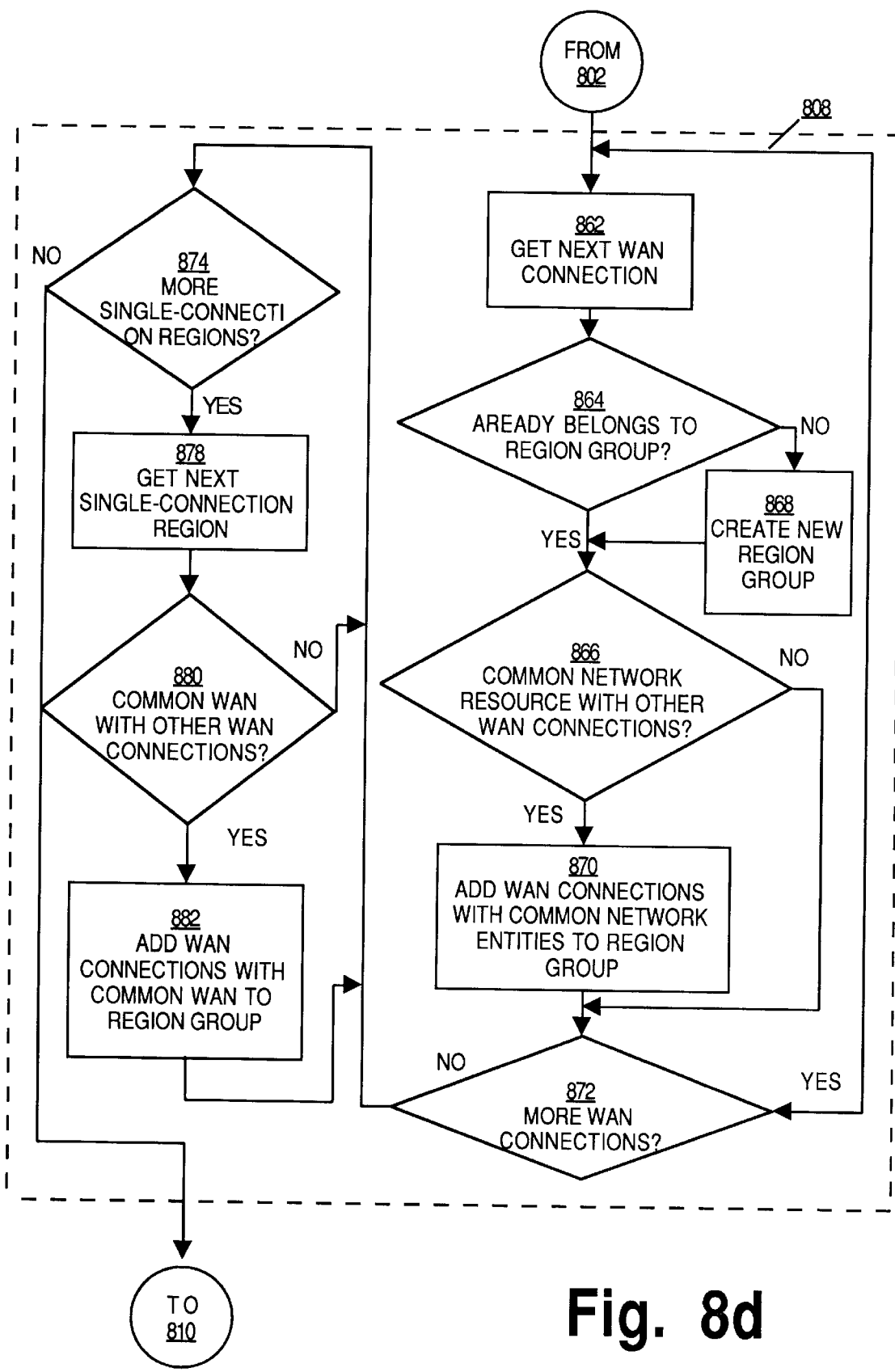
FIG. 8d is a flow chart illustrating step 808 of FIG. 8a in greater detail.

FIG. 8d is a flow chart illustrating step 808 in greater detail. Once the appropriate LAN and WAN connections have been retrieved, control passes to step 862. Steps 862 and 872 define a loop, such that the steps between steps 862 and 872 are performed for each WAN connection.

At step 864, computer system 100 determines whether the currently selected WAN connection already belongs to a region group. If the currently selected WAN connection already belongs to a region group, then control passes to step 866. Otherwise, if the currently selected WAN connection does not already belong to a region group, control passes to step 868.

At step 868, a new region group is created and the current WAN connection is added to the new region group. Control then passes to step 866.

At step 866, computer system 100 determines whether any network resource (i.e. router) connected by the current WAN connection is connected to any other WAN connection that is not already a member of the region group to which the current WAN connection belongs (the "current region group"). If the router connected to the current WAN connection is connected to another WAN connection that is not already a member of the current region group, then control passes to step 870. Otherwise, control passes to step 872.

At step 870, WAN connections that are not already a member of the current region group, but which have a common router with the current WAN connection, are added to the current region group. If any WAN connection being added to the current region group is already a member of another region group, then the other region group is merged into the current region group.

At step 872, computer system 100 determines whether all of the WAN connections have been processed. If all of the WAN connections have been processed, control passes to step 874. Otherwise, control passes back to step 862 and the next WAN connection is processed.

At step 874, computer system 100 determines whether any of the region groups contain only one WAN connection. Such region groups, referred to herein as "single-connection regions", result when the network contains a router that is connected to only one WAN link. Routers 206, 208, 216 and 218 in the exemplary network system 200 are examples of such routers.

If all of the region groups that exist after performing steps 862 to 872 have at least two WAN connections, then control passes to step 810. Otherwise, control passes to step 878.

At step 878, the next single connection region 878 is selected. Steps 874 and 878 define a loop that executes until each single-connection region is processed. After step 878, control passes to step 880.

At step 880, computer system 100 determines whether the connection contained in the current single-connection region has a WAN in common with any other WAN connections. If the connection contained in the current single-connection region has a WAN in common with another WAN connection, then control passes to step 882. Otherwise, control passes back to step 874.

At step 882, if the connection contained in the current single-connection region has a WAN in common with another WAN connection, then the current single-connection region is merged into the region group that contains the other WAN connection. After step 882, control passes back to step 874.

After all of the single-connection regions have been processed according to steps 874 through 882, control passes to step 810. At this point, the only single-connection regions remaining will contain a single connection between (1) a router that is not common to any other WAN connections and (2) a WAN that is not common to any other WAN connections.

Figure 8E:
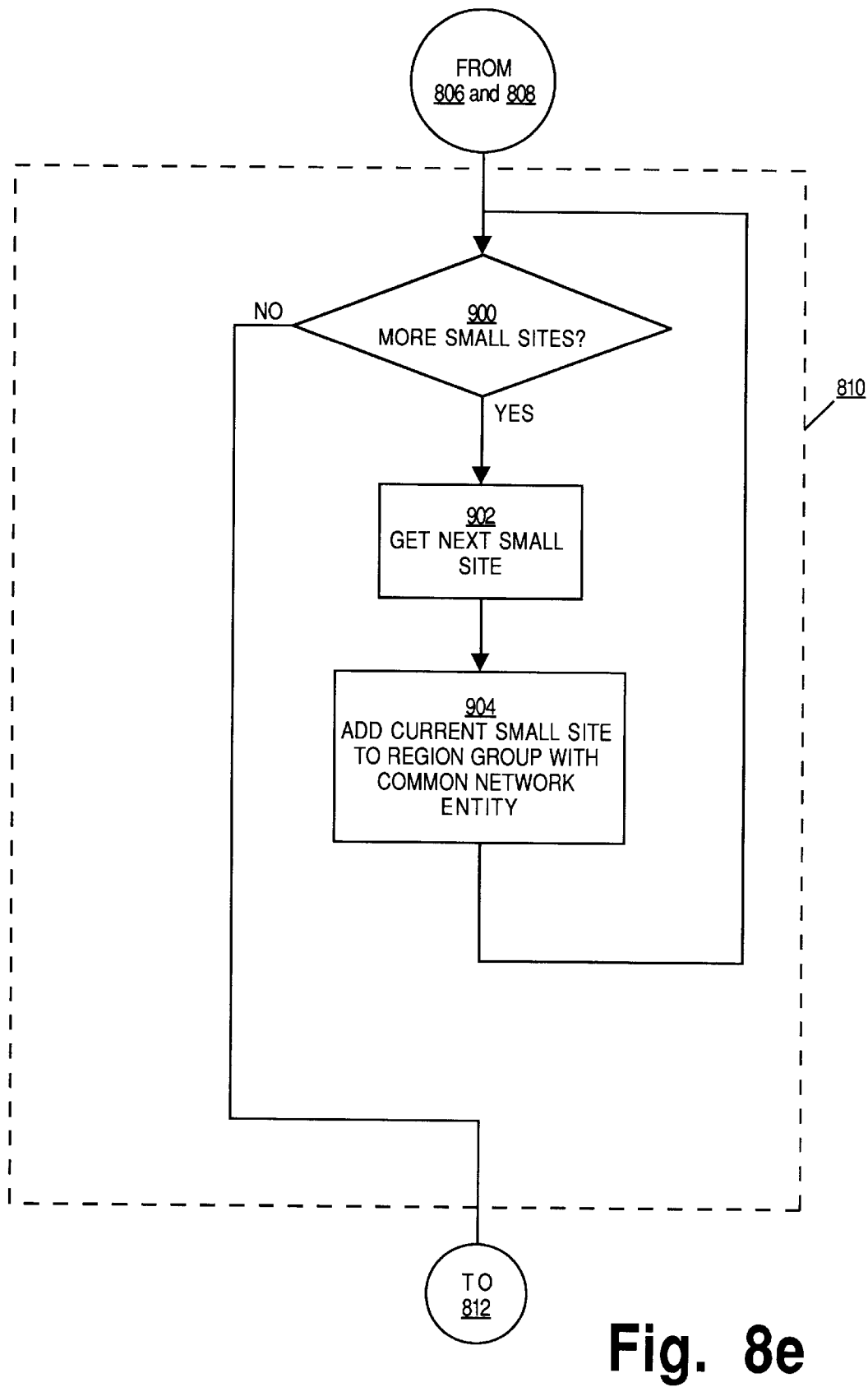
FIG. 8e is a flow chart illustrating step 810 of FIG. 8a in greater detail.

FIG. 8e is a flow chart illustrating step 810 in greater detail. Steps 900 and 902 define a loop such that step 904 is repeated for each small site group that was created during step 806. As explained above, the preferred embodiment of the invention allows a user to specify the threshold that defines small sites. For example, a user may specify that all sites with less that five LANs are "small sites". At step 904, the current small site group is merged into the region group that contains a common network entity with the current small site group. After all of the small site groups have been processed, control passes to step 814.

While specific embodiments of the present invention have been described, various modifications and substitutions will become apparent to one skilled in the art by this disclosure. Such modifications and substitutions are within the scope of the present invention, and are intended to be covered by the following claims.

What is claimed is:

1. A computer-implemented method for grouping a network entity of a network system into one of a plurality of logical groups, wherein said network entity is connected to other network entities by at least a first connection, the method comprising the steps of:

determining whether said first connection is a LAN connection or a WAN connection;

if said first connection is a LAN connection, then determining whether a further LAN connection is connected to said network entity;

if a further LAN connection is not connected to said network entity, then assigning only said first connection to a predetermined site group;

if a further LAN connection is connected to said network entity, then assigning both said first connection and said further connection to said predetermined site group;

assigning said network entity to one of said plurality of logical groups according to said predetermined site group of said first connection; and generating on a display device a plurality of visual indicators, said plurality of visual indicators including a single visual indicator for said one of said plurality of logical groups.

2. The computer-implemented method of claim 1 including the steps of:

if said first connection is a WAN connection, then determining whether a further WAN connection shares a network resource with said first connection; and if a further WAN connection shares said network resource with said first connection, then assigning said first and said further connections to a common region group.

3. The computer-implemented method of claim 2 wherein if said first connection does not share a network resource with a further WAN connection, then assigning said first connection to the same region group as any other WAN connection that shares a common WAN with said first connection.

4. The computer-implemented method of claim 3 wherein said network system includes one or more small site groups, and the method further includes the step merging said one or more small site groups into a plurality of region groups.

5. The computer-implemented method of claim 4 further including the steps of:

receiving input from a user that specifies a criteria for determining whether a site group is a small site group; and determining which of a plurality of site groups are small site groups based upon the criteria specified by said user.

6. The computer-implemented method of claim 4 further comprising the steps of:

generating on a display device a display of said network system based on said plurality of logical groups by:

displaying on said display device a single visual indicator for each region group of a plurality of region groups; and displaying on said display device a single visual indicator for each site group of a plurality of site groups that is not a small site group.

7. The computer-implemented method of claim 1 further including the steps of:

retrieving connection data indicating a connection type for said first connection from said network entity;

storing said connection data in a database on a storage device;

receiving user input requesting a display of said network system;

retrieving said connection data from said database in response to said user input; and inspecting said connection data to determine whether said first connection is a LAN connectin or a WAN connection.

8. The computer-implemented method of claim 7 wherein:

said step of receiving user input includes receiving user input specifying a view of said network system, said view corresponding to a subset of said network system; and said step of retrieving said connection data from said database includes retrieving connection data that represents connections that exist in said subset of said network system.

9. The computer-implemented method of claim 1 further comprising the step of generating on a display device a display of said network system based on said plurality of logical groups.

10. The computer-implemented method of claim 9 further comprising the steps of:

establishing whether said predetermined site group includes more than one local area network; and if so, designating said predetermined site group as a campus group, and generating on said display device a single visual indicator for said campus group.

11. The computer-implemented method of claim 1 wherein each logical group of said plurality of logical groups includes a set of connections, the method further comprising the steps of:

for each given logical group of said plurality of logical groups, establishing all network entities connected to any connection in the set of connections in said given logical group as members of said given logical group; and for each network entity that is established as a member of said given logical group, performing the step of, if said network entity includes one or more network resources, establishing the one or more network resources as members of said given logical group.

12. The computer-implemented method of claim 11 wherein the steps of establishing all network entities connected to any connection in the set of connections in said given logical group as members of said given logical group and establishing the one or more network resources as members of said given logical group are performed by traversing a database that stores data representing the topology of said network system.

13. An apparatus for displaying a network system that contains a plurality of network entities connected to each other by a plurality of connections, wherein each connection of said plurality of connections corresponds to one of a plurality of connection types, the apparatus comprising:

a processor;

a display device coupled to said processor;

a memory coupled to said processor, wherein the memory contains a sequence of instructions;

wherein said processor is configured to retrieve said sequence of instructions from said memory and execute said sequence of instructions;

wherein execution of said sequence of instructions causes said processor to:

(a) identify which of said plurality of connections are LAN connections;

(b) assign a respective LAN connection to a predetermined site group;

(c) determine whether any further LAN connections share a common network entity with said respective LAN connection and, if so, to assign said further LAN connections to said predetermined site group;

(d) repeat steps (b) and (c) until each LAN connection within said plurality of connections is assigned to one of a plurality of site groups;

(e) assign each network entity to one of a plurality of logical groups based on the site group of a connection connected to each respective network entity; and (f) generate on said display device a plurality of visual indicators, wherein said plurality of visual indicators include a single visual indicator for each logical group of said plurality of logical groups.

14. The apparatus of claim 13 wherein the sequence of instructions includes:

instructions for causing said processor to retrieve connection data that represents said plurality of connections; and instructions for causing said processor to inspect said connection data to determine which connections of said plurality of connections are LAN connections.

15. The apparatus of claim 14 wherein the instructions for causing said processor to group said plurality of network entities into said plurality of logical groups include instructions which cause said processor to create a plurality of region groups;

the sequence of instructions further including instructions for causing said processor to create said plurality of region groups, wherein said instructions for causing said processor to create said plurality of region groups include instructions for causing said processor to inspect said connection data to determine which connections of said plurality of connections are WAN connections; and instructions for causing said processor to assign a respective WAN connection to a region group to which other WAN connections that share a common network resource with said respective WAN connection have been assigned.

16. The apparatus of claim 15 wherein the instructions for causing said processor to assign said respective WAN connection to one of said plurality of region groups include instructions for causing said processor to assign said respective WAN connection to the same region group as any other WAN connection that shares a common WAN with said respective WAN connection if said respective WAN connection of does not share a network resource with any other WAN connections.

17. The apparatus of claim 16 wherein:

said plurality of site groups includes one or more small site groups; and the sequence of instructions further includes instructions for merging into said plurality of region groups said one or more small site groups of said plurality of site groups.

18. The apparatus of claim 17 wherein said sequence of instructions further comprise:

instructions which cause said processor to display on said display device a single visual indicator for each region group of said plurality of region groups; and instructions which cause said processor to display on said display device a single visual indicator for each site group of said plurality of site groups that is not a small site group.

19. The apparatus of claim 16 further including an input device, wherein the sequence of instructions further includes:

instructions which cause said processor to receive input responsive to user manipulation of said input device, wherein the input specifies a criteria for determining whether a site group is a small site group; and instructions which cause said processor to determine which of said plurality of site groups are small site groups based upon the criteria specified by said input.

20. The apparatus of claim 14 further including a storage device, wherein the sequence of instructions further includes:

instructions which cause said processor to retrieve said connection data from said plurality of network entities;

instructions which cause said processor to store said connection data in a database on said storage device;

instructions which cause said processor to receive user input requesting a display of said network system; and instructions which cause said processor to retrieve said connection data from said database in response to said user input.

21. The apparatus of claim 20 wherein:

said instructions for causing said processor to receive user input include instructions which cause said processor to receive user input specifying a view of said network system, said view corresponding to a subset of said network system; and said instructions for causing said processor to retrieve said connection data from said database include instructions which cause said processor to retrieve only connection data that represents connections that exist in said subset of said network system.

22. The apparatus of claim 14 wherein said sequence of instructions further comprise:

instructions which cause said processor to establish each site group that includes more than one local area network as a campus group; and instructions which cause said processor to generate on said display device a single visual indicator for each campus group.

23. The apparatus of claim 14 wherein each logical group of said plurality of logical groups includes a set of connections of said plurality of connections, the sequence of instructions further comprising:

a) instructions for causing said processor to establish all network entities connected to any connection in the set of connections of a given logical group as members of said given logical group;

b) instructions for causing said processor to establish one or more network resources as members of said given logical group if a network entity that is a member of said given logical group includes said one or more network resources;

c) instructions for causing said processor to execute the b) instructions for each given network entity, in the given logical group, that includes one or more network resources; and d) instructions for causing said processor to execute the a) b) and c) instructions for each given logical group of said plurality of logical groups.

24. The apparatus of claim 23 further comprising a storage device containing a database of data representing the topology of said network system, wherein the a) instructions for causing the processor to establish all network entities connected to any connection in the set of connections in said given logical group as members of said given logical group and the b) instructions for causing said processor to establish one or more network resources as members of said given logical group include instructions for causing said processor to traversing said database.

* * * * *